United States Patent [19]

Vandeweghe et al.

[11] Patent Number: 5,014,754
[45] Date of Patent: May 14, 1991

[54] ATTACHMENT FOR GUARD PLATES IN WEAVING MACHINES

[75] Inventors: Michel Vandeweghe, Wijtschate-Heuvelland; Willy Vanheule, Ieper, both of Belgium

[73] Assignee: Picanol N.V., Ieper, Belgium

[21] Appl. No.: 549,082

[22] Filed: Jul. 6, 1990

[30] Foreign Application Priority Data

Jul. 6, 1989 [BE] Belgium .............................. 8900737

[51] Int. Cl.⁵ .......................................... D03D 49/02
[52] U.S. Cl. .................................. 139/1 R; 220/241; 220/306; 312/257.1; 403/13; 403/157
[58] Field of Search ........................ 220/306, 241, 315; 403/14, 13, 157; 312/257.1, 265.6; 139/1 R

[56] References Cited

U.S. PATENT DOCUMENTS

| | | |
|---|---|---|
| 2,664,332 | 12/1953 | Herrick . |
| 2,705,022 | 3/1955 | Picanol .............................. 139/1 R |
| 4,103,981 | 8/1978 | Donahue et al. ................. 312/265.6 |
| 4,153,313 | 5/1979 | Propst .............................. 220/306 X |
| 4,577,526 | 3/1986 | Stabler . |
| 4,706,714 | 11/1987 | Schärer .............................. 139/1 R |

FOREIGN PATENT DOCUMENTS 725974 12/1968 Belgium .
466830 12/1968 Switzerland .

Primary Examiner—Andrew M. Falik
Attorney, Agent, or Firm—Bacon & Thomas

[57] ABSTRACT

Attachment for guard plates in weaving machines, characterized in that it essentially consists of at least three couplings (3), each formed by a cylinder-shaped element (4) which is attached to the guard plate (1), and a seating (5) which is mounted to the frame (2) of the weaving machine and which closes flexibly round the cylinder-shaped element (4), whereby at least one coupling (3) is situated at the top of the guard plate (1), whose cylinder-shaped element (4) has a vertical or almost vertical axis (6), and whereby at least two couplings (3) are situated at the bottom of the guard plate (1), whose cylinder-shaped elements (4) have horizontal or almost horizontal axes (7) in line with each other.

12 Claims, 3 Drawing Sheets

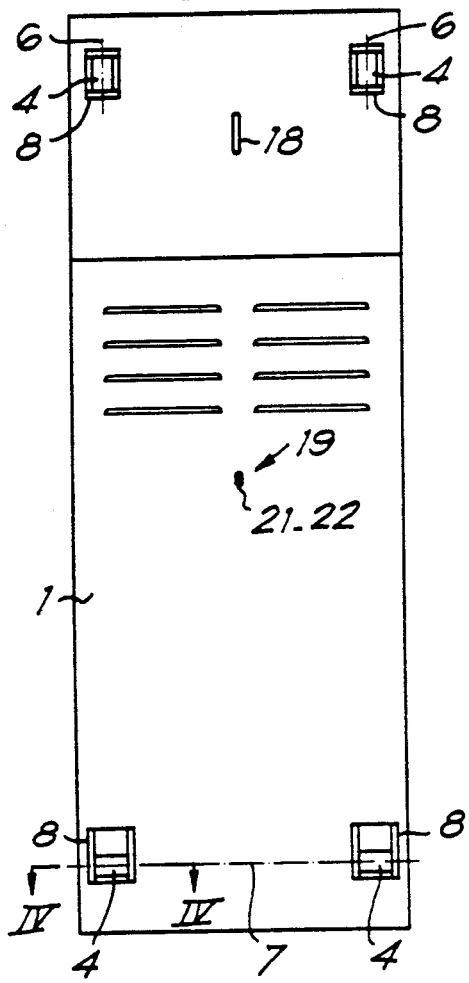
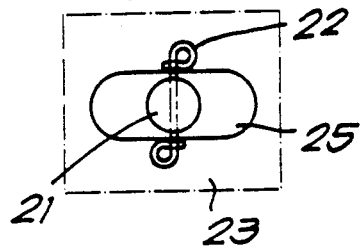
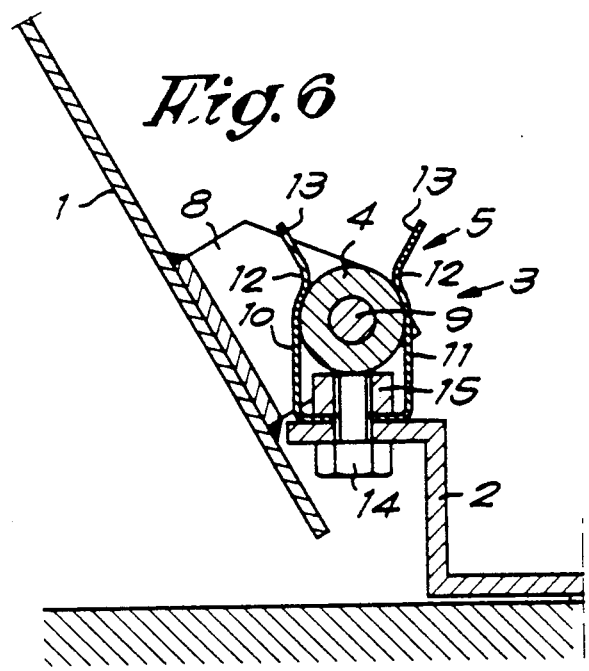
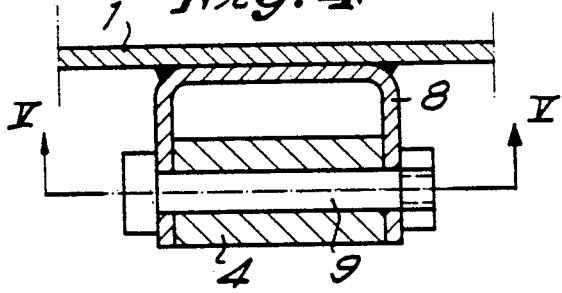

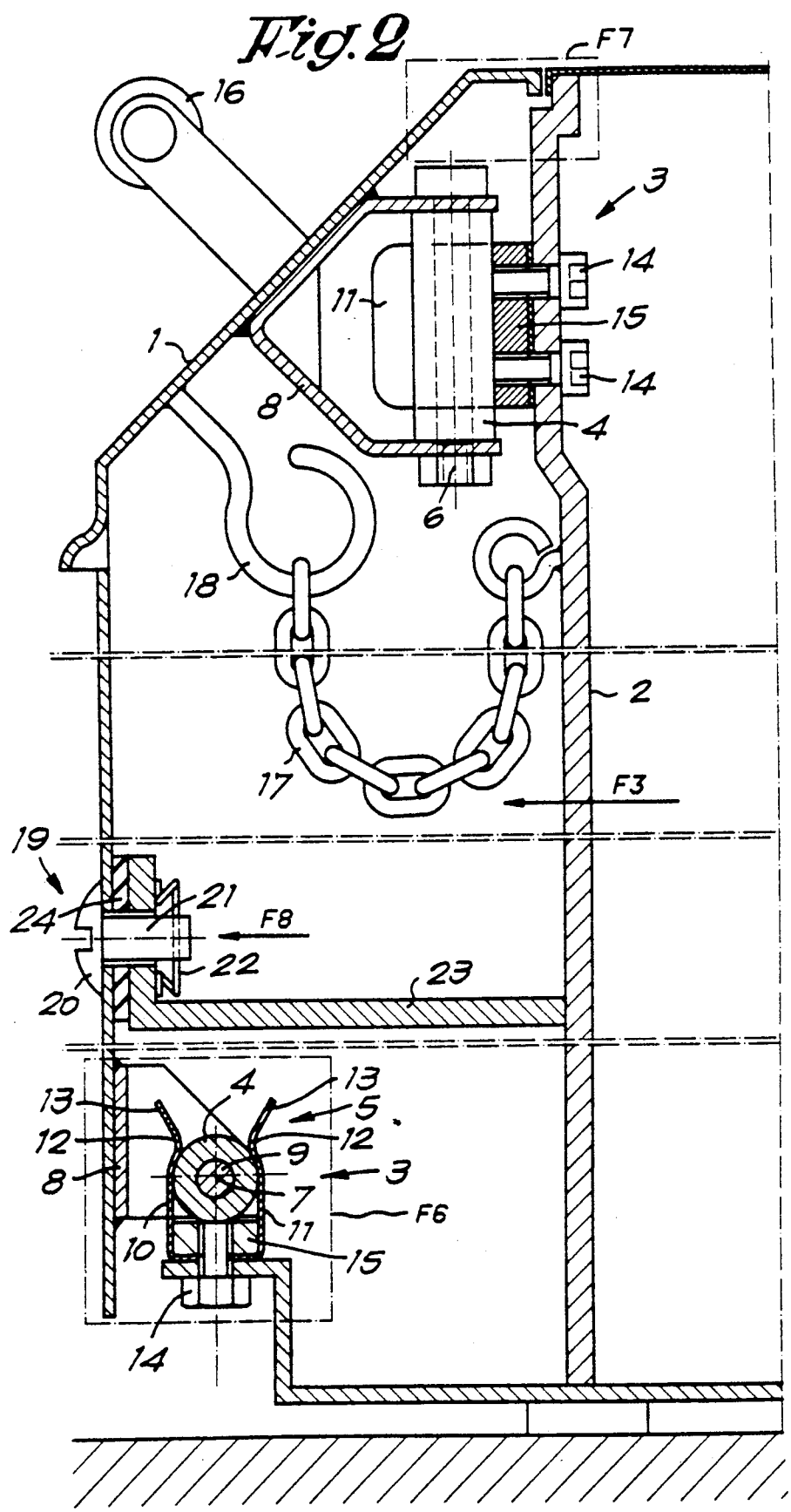

ATTACHMENT FOR GUARD PLATES IN WEAVING MACHINES

The present invention concerns a means of attachment for guard plates in weaving machines.

It is known that weaving machines are provided with guard plates at their sides, respectively in order to protect the weavers against rotating parts, to protect the parts against dust penetration, and to give the weaving machine an aesthetic appearance.

It is clear that such guard plates must be easy to remove, in order to have easy access to the parts in case of maintenance or repair of the weaving machines. Given the vibrations in weaving machines, these guard plates must in addition be attached very firmly.

Traditionally, the attachment of the guard plates is by means of bolt connections. These bolt connections have the disadvantage that removal and application of the guard plates is time-consuming, that the bolts hereby used can get lost, that after frequent use the bolts give less good connections, and that the positioning of the guard plates during the application of the bolts is cumbersome.

The present invention therefore concerns a means of attachment for guard plates in weaving machines which does not have the above-mentioned disadvantages, in other words which allows a guard plate to be positioned, mounted and dismounted easily, while the technician or the weaver can hold the guard plate with both hands.

To this end, the invention concerns a means of attachment for guard plates in weaving machines, characterized in that it consists essentially of at least three couplings which are each formed by a cylinder-shaped element attached to the guard plate, and a seating which closes flexibly about the cylinder-shaped element and which is mounted to the frame of the weaving machine, whereby at least one coupling is situated at the top of the guard plate, the cylinder-shaped element of which has a vertical or almost vertical axis, and whereby at least two couplings are situated at the bottom of the guard plate, the cylinder-shaped elements of which have horizontal or almost horizontal axes in line with each other.

In order to explain the characteristics of the invention, by way of example only and without being limitative in any way, the following preferred embodiments are described with reference to the accompanying drawings, where:

FIG. 2 shows a cross-section according to line II—II in FIG. 1, to a greater scale;

FIG. 3 shows a view according to arrow F3 in FIG. 2; particularly of the guard plate in dismounted position;

FIG. 4 shows a cross-section according to line IV—IV in FIG. 3;

FIG. 5 shows a variant for the cross-section according to line V—V in FIG. 4;

FIG. 6 shows the part indicated in FIG. 2 by F6, for another position;

FIG. 8 shows a view according to arrow F8 in FIG. 2.

FIG. 1 shows a weaving machine provided with guard plates 1.

Figure 1:
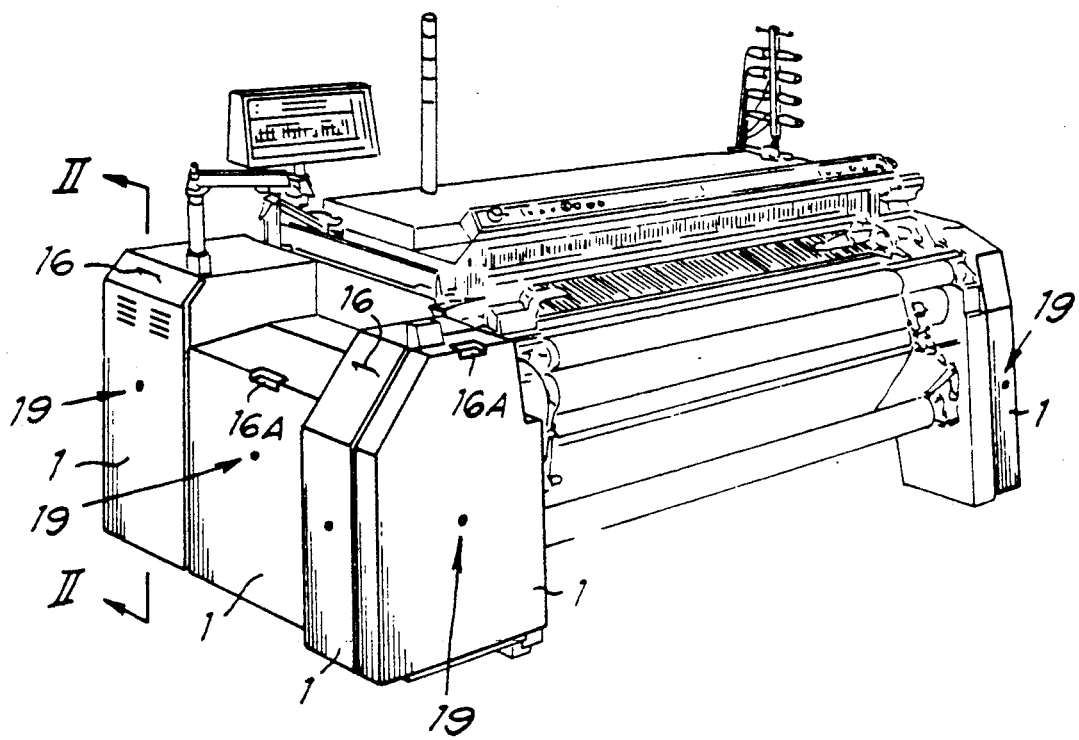
FIG. 1 shows a weaving machine in perspective.

As shown in FIGS. 2 and 3, these guard plates 1 are attached to the frame 2 of the weaving machine by means of a means of attachment which, according to the present invention, essentially consists of at least three, and preferably four couplings 3, which are each formed by a cylinder-shaped element 4 attached to the guard plate 1 concerned, and a seating 5 which closes flexibly round the cylinder-shaped element 4 and which is mounted to the frame 2 of the weaving machine, whereby at least one coupling 3, and preferably two, are situated at the top of the guard plate 1, while at least two couplings 3 are situated near the bottom edge of the guard plate.

Hereby the axes 6 of the cylinder-shaped elements 4 belonging to the top couplings 3 are vertical or almost vertical, and the axes 7 of the cylinder-shaped elements 4 belonging to the bottom couplings 3 are horizontal or almost horizontal and in line. The above-mentioned axes 6 and 7 are also parallel to the side of the weaving machine against which the guard plate 1 concerned is applied.

As shown in FIG. 4, the cylinder-shaped element 4 of each coupling 3 is attached at its end to a U-shaped support 8, for example by means of a bolt 9 going through said support 8. As shown in the variant of FIG. 5, the legs of the support 8 have a U-shaped section in order to strengthen the whole.

The cylinder-shaped elements 4 preferably consist of a dampening material, such as a synthetic material. As a result, the attachment of the guard plate 1 is less sensitive to the vibrations caused by the weaving machine.

The above-mentioned seatings 5 preferably consist of two flexible elements 10 and 11, mounted next to one another and having bent parts 12, which can close about the cylinder-shaped elements 4, and which at their top ends have widening parts 13, which facilitate the application of the cylinder-shaped elements 4 in the seatings 5, as shown in FIG. 2.

The flexible elements 10 and 11 may consist of leaf springs, for example made in one piece and having a U shape. These leaf springs are for example attached to the frame 2 by means of bolts 14 and nuts or a clamp 15 provided with tap holes, whereby these clamps 15 can also form stops for the cylinder-shaped elements 4 applied in the seatings 5.

Application and removal of the guard plates 1 can be easily deduced from the figures. The guard plate 1 is first placed in the concerned seatings 5 at the bottom, through which a first positioning takes place in the vertical sense, then the plate is turned and pressed in the top seatings 5, through which a positioning takes place in the horizontal sense. This offers the advantage that the top couplings 3 do not have be mounted visibly.

The fact that the cylinder-shaped elements 4 of the bottom couplings 3 are mounted horizontally in line with each other offers the advantage that the guard plate can be easily turned at the bottom, as shown in FIG. 6, for example to perform a setting at the weaving machine.

The guard plate 1 can in this case be pulled loose by means of a grip 16 which for example is fixed to the guard plate 1, as shown in FIG. 2. According to a variant, the grip, indicated by 16A in FIG. 7, can also be an integral part of the guard plate 1 itself, for example because it has been provided with a cavity or similar.

To prevent the guard plate from turning over too great an angle, a flexible connection is applied between the top part of the guard plate 1 and the frame 2, for example formed by a chain 17, which on the one hand is attached fixedly to the frame 2, and which on the other hand is attached removably to the guard plate 1, for example by means of a hook 18.

According to the invention, the guard plate 1 may be provided with a supplementary lock 19, which, as shown in FIG. 2, essentially consists of an element 21 which can be turned by means of a screw head 20, and which has flexible hooking means 22, which act upon the back of the frame 2 or a support 23 attached to it. Between the guard plate 1 and the above-mentioned support 23, a ring 24 in dampening material may be provided.

Figure 7:
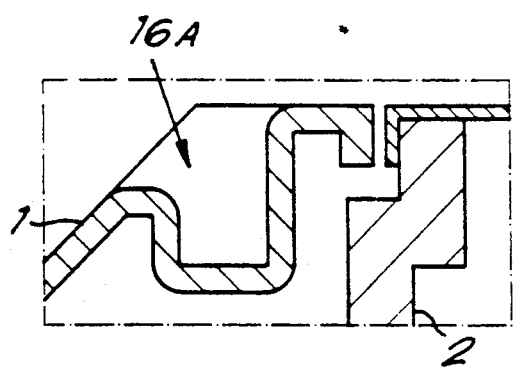
FIG. 7 shows a variant of the part indicated in FIG. 2 by F7.

As shown in FIG. 7, these hooked means 22 may consist of a thread spring mounted on the turnable element 21, which fits through an elongated opening 25 in the support 23 which acts behind the edges of this opening 25 through the turning of the element 21.

The present invention is no way limited to the embodiments described by way of example and shown in the drawings; on the contrary, such an attachment for guard plates in weaving machines can be made in all shapes and dimensions while still remaining within the scope of the invention.

We claim:

1. An attachment for guard plates in weaving machines, comprising at least three couplings, each formed by a cylinder-shaped element which is attached to a guard plate, and corresponding seating means mounted to a frame of the weaving machine for closing flexibly around the cylinder-shaped element when the guard plate is coupled to the frame, wherein at least one of said couplings is situated at a top of the guard plate, the cylinder-shaped element of said top coupling having a substantially vertical axis, and wherein at least two of said couplings are situated at a bottom of the guard plate, the cylinder-shaped elements of said bottom couplings having substantially horizontal axes in line with each other.

2. An attachment as claimed in claim 1, wherein the number of said couplings is four, two of said couplings are situated at the bottom of the guard plate, and two of said couplings are situated at the top of the guard plate.

3. An attachment as claimed in claim 1, wherein at least one of said cylinder-shaped elements has an end which is attached to a support on said guard plate.

4. An attachment as claimed in claim 1, wherein at least one of said cylinder-shaped elements is made of dampening material.

5. An attachment as claimed in claim 4, wherein at least one of said cylinder-shaped elements is made of synthetic material.

6. An attachment as claimed in claim 1, wherein at least one of said seating means comprises two flexible elements mounted adjacent one another and having bent parts which close about the corresponding cylinder-shaped element, said flexible elements further having means including widening parts for facilitating coupling of a cylinder-shaped element to said flexible elements.

7. An attachment as claimed in claim 6, wherein the flexible elements are leaf springs.

8. An attachment as claimed in claim 7, wherein said leaf springs are each made in one piece and have a U-shape.

9. An attachment as claimed in claim 8, wherein the U-shaped leaf springs are each mounted by means of a bolt and a clamp, and wherein said clamp is engaged by and thereby forms a stop for the cylinder-shaped element when said cylinder-shaped element is coupled with said seating means.

10. An attachment as claimed in claim 1, further comprising a supplementary lock including hooking means for connecting the guard plate with the frame upon turning of the hooking means.

11. An attachment as claimed in claim 10, further comprising detachable connection means between the top of the guard plate and the frame of the weaving machine for allowing the guard plate to open over a predetermined angle.

12. An attachment as claimed in claim 1, wherein the bottom couplings permit the guard plate to be turned around said horizontal axes.

* * * * *